United States Patent [19]
Frigo et al.

[11] Patent Number: 5,375,390
[45] Date of Patent: Dec. 27, 1994

[54] MACHINE FOR MAKING AND POSITIONING BAGS MADE OF HOT-MELT PLASTIC MATERIAL

[75] Inventors: Luigi Frigo, Via Lago di Caldonazzo, 11, 36051 Schio, Vicenza, Italy; Ken Giesbrecht, Jordan, Canada

[73] Assignees: Technopac, Inc., Ontario, Canada; Luigi Frigo, Schio, Italy

[21] Appl. No.: 89,819

[22] Filed: Jul. 12, 1993

Related U.S. Application Data

[63] Continuation-in-part of Ser. No. 824,168, Jan. 22, 1992, abandoned.

[30] Foreign Application Priority Data

May 22, 1991 [IT]   Italy ................. VI91 A 000086

[51] Int. Cl.⁵ ............... B65B 43/04; B65B 43/28; B65B 43/36; B65B 5/02
[52] U.S. Cl. .................................. 53/66; 53/75; 53/77; 53/562; 53/570; 53/385.1; 53/373.7
[58] Field of Search ............ 53/570, 562, 385.1, 53/66, 77, 75, 455, 459, 469, 386.1, 373.7

[56] References Cited

U.S. PATENT DOCUMENTS

| | | | |
|---|---|---|---|
| 2,265,075 | 12/1941 | Knuetter | 53/455 |
| 3,147,674 | 9/1964 | Hoeppner | 493/210 |
| 3,197,936 | 8/1965 | Messmer | 53/385.1 X |
| 3,490,195 | 1/1970 | Abramson | 53/385.1 X |
| 3,508,379 | 4/1970 | Noyes et al. | 53/385.1 |
| 4,055,109 | 10/1977 | Kan | 493/201 |
| 4,201,031 | 5/1980 | Wiles | 53/562 |
| 4,268,346 | 5/1981 | Achelpohl | 493/194 |
| 4,313,781 | 2/1982 | Rovigo | 53/562 |
| 4,393,640 | 7/1983 | Cole | 53/386.1 |
| 4,543,768 | 10/1985 | Nishikawa et al. | 53/570 X |
| 4,548,018 | 10/1985 | Wojnicki | 53/562 X |
| 4,617,785 | 10/1986 | Chikatani | 53/562 |
| 5,058,364 | 10/1991 | Seiden | 53/562 |
| 5,152,124 | 10/1992 | Ishii et al. | 53/570 |

*Primary Examiner*—Horace M. Culver
*Attorney, Agent, or Firm*—Longacre & White

[57] ABSTRACT

A machine for making and positioning plastic bags, constituted by a frame which includes: a feeder (3) for a band of plastic (B); a device (6) for creating a bellows-like fold in the band; a device (10) for cutting and fusing the band; a conveyor belt (18); a filling unit for filling the bags with a product; a nozzle for inflating the bags to insert the products; a device (25) for securing the bags so as to arrange them at the same angle as the product.

16 Claims, 3 Drawing Sheets

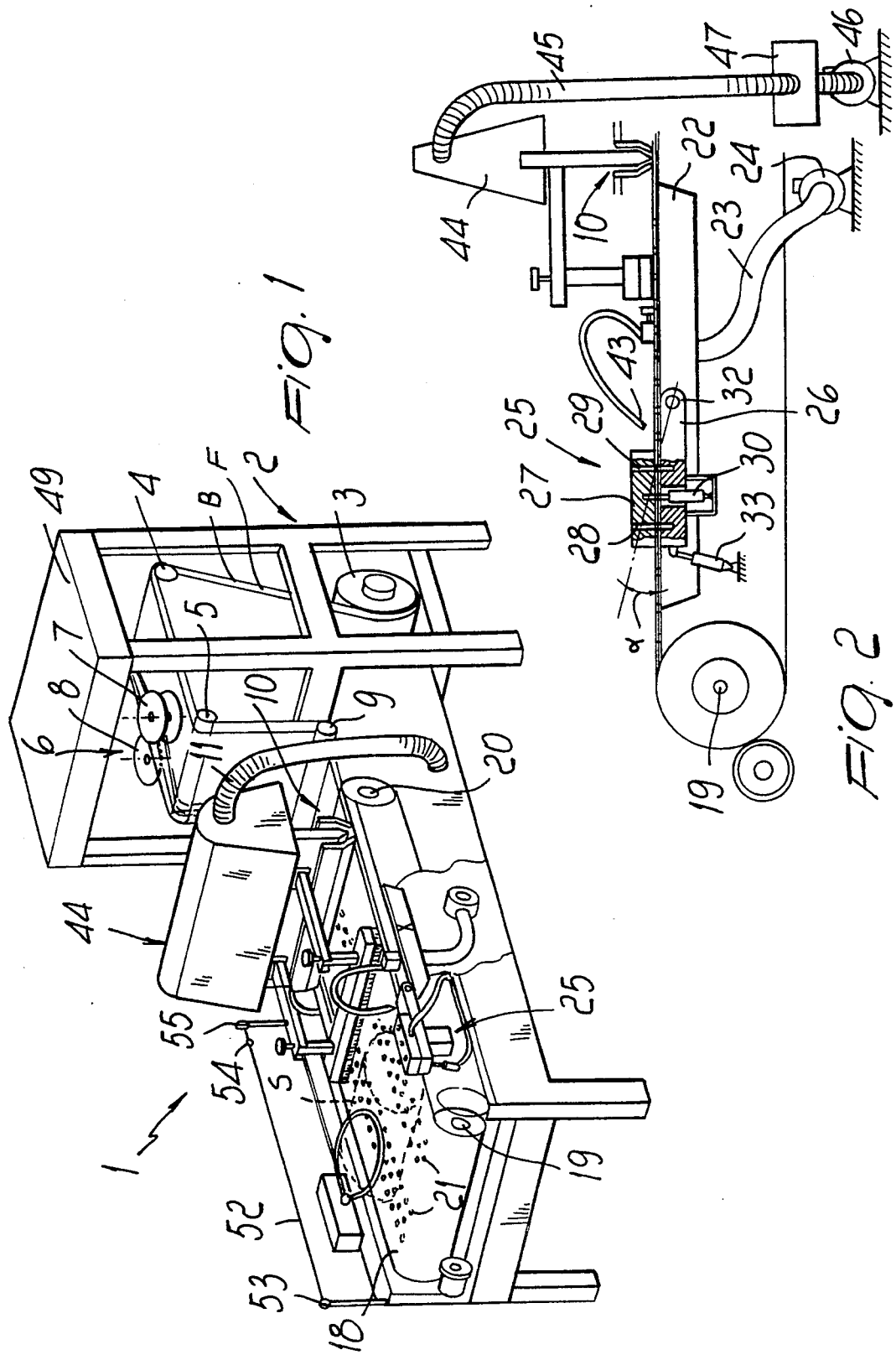

MACHINE FOR MAKING AND POSITIONING BAGS MADE OF HOT-MELT PLASTIC MATERIAL

This is a continuation-in-part of application Ser. No. 07/824,168, filed Jan. 22, 1992 and abandoned simultaneously with the filling of the present application.

The present invention relates to a machine for making and positioning bags made of hot-melt plastic material, meant to be filled with products having a substantially prismatic shape.

A very common field of application of these machines is the packaging of perishable goods or food products, such as bakery products or bread loaves, which must be inserted in sealed bags directly after baking to avoid losing their fragrance. Naturally, the machine according to the invention can also be used for non-food products which must be packaged in the same manner.

It is known that machines of this kind must allow the highest possible packaging speed in order to reduce processing times and to handle the capacity of the upstream and downstream systems.

Correspondingly, the movement speed of the various parts, in particular of the conveyor belts or of the surfaces for the intermittent advancement of the finished bags, must be kept as high as possible to allow an increase in capacity. These capacities and speeds, however, must be matched by adequate reliability and repetitiveness in order to avoid periodic stoppages and a larger presence of supervisory personnel.

Currently commercially available machines allow capacities of 40 to 60 bags per minute, with peak speeds of 100 to 120 meters per minute. If the packaging speed and rate are increased, the reliability of the machine drops considerably and can be maintained only when the machine is new and with accurate adjustments.

Italian patent application no. V191A000086 describes a machine for making bags made of hot-melt plastic material starting from a band of transparent film made of hot-melt material, and a means for the intermittent advancement of the base toward a filling unit arranged downstream of the machine.

The filling station has a clamp for transferring one product at a time from a feeder belt toward the filling area of the machine. Before inserting the product, each bag is inflated by means of a jet of compressed air which is emitted from a nozzle which is aligned with a bag securing means.

Although this machine allows a considerable increase in capacity, it has some acknowledge drawbacks which occur between the bag fusing and cutting step and the filling step.

A first drawback is due to the fact that in order to ensure that the products to be inserted in the open bags are always arranged in the same position, the transfer clamp includes an angular support with a lower surface which is inclined with respect to the horizontal. In this manner, during insertion the clamp enters the bag so that it is slightly rotated with respect to the bag and might interfere with its open edge.

A further drawback of the machine described in the above mentioned patent consists of the fact that if the bag advancement rate is increased, the grip of the bags on the supporting surface in the region directly upstream of the filling station decreases. Furthermore, the bag can roll up or rise locally and cannot be stably retained prior to inflation. In any case, it is necessary to indicate the absence of an inflated bag in front of the filling station.

Another drawback consists of the fact that the fumes from the fusing of the edges of the bags can be aspirated together with the surrounding air and be blow into the bags prior to sealing them.

Still another drawback is constituted by the imperfect or excessive melting of the fused edges due to heat dispersion around the fusing blade.

Finally, in order to vary the width of the bags it is necessary to perform complicated operations for adjusting and synchronizing the advancement speed of the machine with the speed of the filling unit.

The aim of the present invention is to eliminate the drawbacks described above by providing a machine for making and positioning bags made of hot-melting plastic material, meant to be filled with products having a substantially prismatic shape, which includes a frame which supports; a means for the feeding and intermittent advancement of a band of hot-melt plastic material in a present direction; a means for folding the band on itself along an intermediate line with respect to the longitudinal edges, so as to form the superimposed flaps joined along the folding line, so that the lower flap protrudes with respect to the upper one: a means for creating a bellows-like recess along the folding line; a means for the simultaneous fusing and cutting of the band folded along a transverse direction in longitudinally spaced positions, so as to form a series of adjacent bags which have one side open at the superimposed flaps; a substantially horizontal movable conveyance surface, provided with a negative-pressure means in a downward region, for separating the bags and transferring them sequentially toward a product filling station which is provided with a clamp for gripping one product at a time with a lower resting surface which is inclined with respect to the horizontal, the clamp being movable, in a reciprocating manner, transversely with respect to the bag advancement direction; a means for injecting compressed air into each individual bag through its open side to inflate it prior to filling; a securing means for retaining each individual bag along the edge of its lower flap during its inflation by the injection means; wherein the securing means is mounted so as to be able to oscillate on the frame about a substantially horizontal transverse axis between a substantially horizontal position and an inclined position which is substantially parallel to the resting surface of the clamp of the filling station, so as to perfectly align the inflated bag with respect to the products, facilitating their insertion without interference with the edge of the bag.

In a further aspect, the securing means includes a base member, which is pivoted to the frame with one end, and a presser which is superimposed on the member and can be moved toward or away from it in order to secure the loose edge of a bag.

Preferably, the presser has, in a substantially central position, a main nozzle for injecting compressed air into the secured bag.

It is possible to provide a secondary nozzle which is arranged upstream of the securing means and is directed toward the edge of the bag to be secured, in order to keep it stably in contact with the conveyance surface at the same level as the securing means in a horizontal position.

In a further aspect of the invention, the fusing and cutting means includes an electrically heated blade which is interposed between, and elastically coupled to, two lateral members for retaining the band, wherein the retention members are hollow and are cooled by means of a liquid coolant which circulates inside them so that their edges which are in contact with the band remain at a relatively low temperature during fusing.

BRIEF DESCRIPTION OF THE DRAWINGS

For a better understanding of the invention, a preferred embodiment of a bag-making machine according to the invention is described hereinafter and is illustrated only by way of non-limitative example in the accompanying drawings, wherein:

FIG. 1 is a general perspective view of a bag-making machine according to the invention without a product filling station;

FIG. 2 is a partially sectional side view of some details of FIG. 1;

Figure 3:
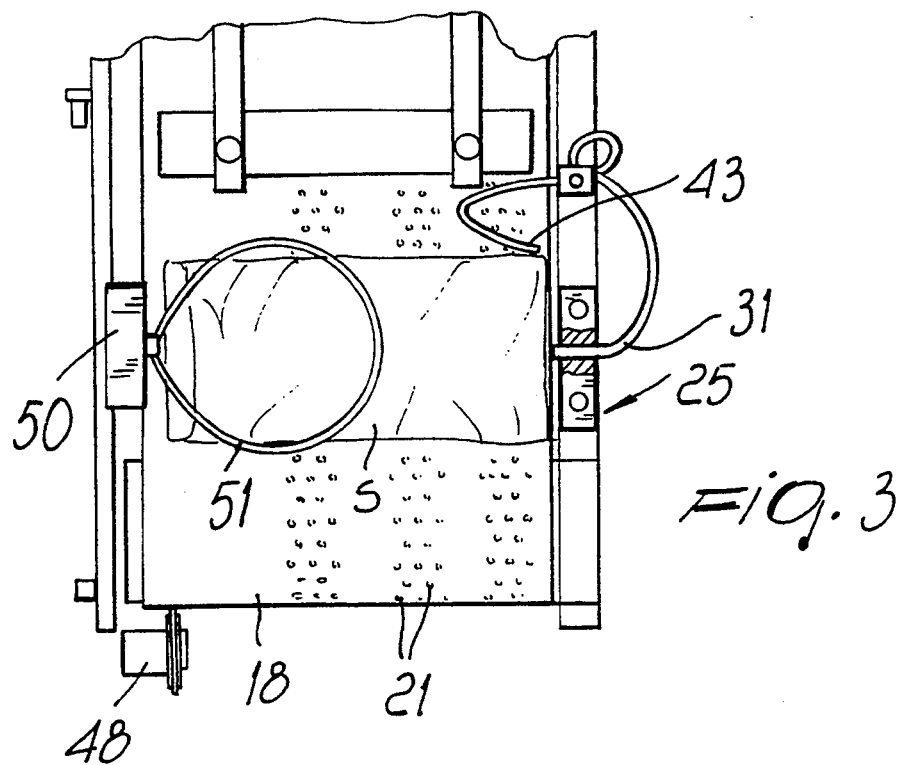
FIG. 3 is a top view of the terminal region of the machine according to the invention.
Figure 4:
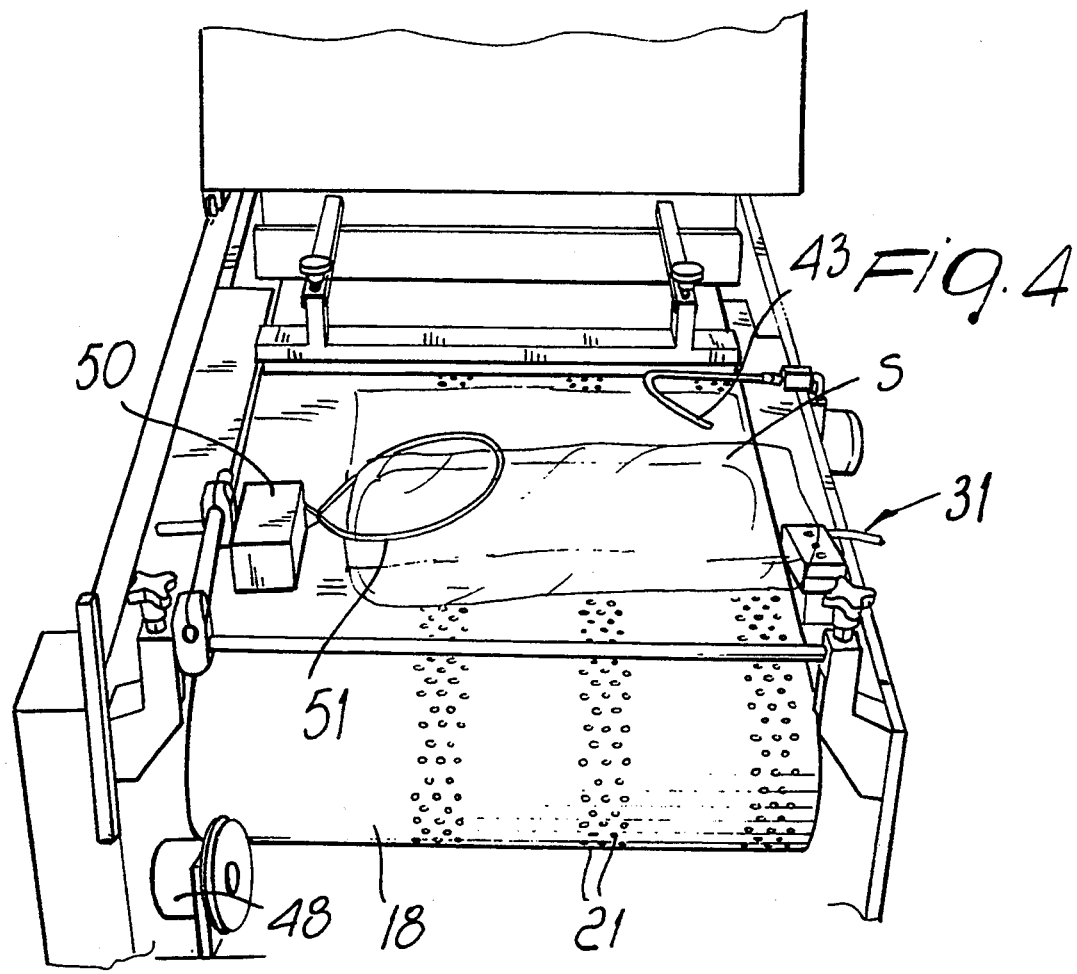
FIG. 4 is a top elevation view of the detail of FIG. 3.
Figure 5:
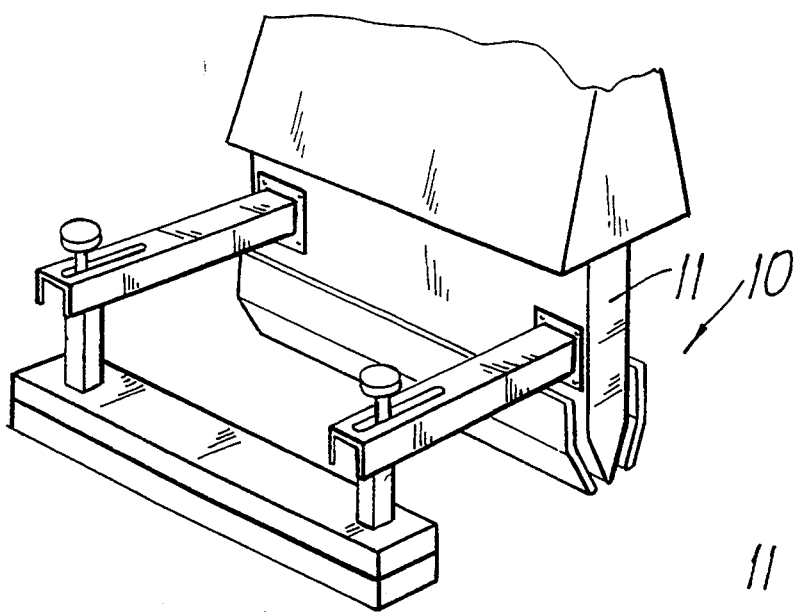
FIG. 5 is a perspective view of another detail of the machine of FIG. 1.

With reference to the above figures, a bag-making machine according to the invention, generally designated by the reference numeral 1, includes a frame 2 made of profiled members and metal plates which supports a series of devices for making bags S starting from a band B made of hot-melt plastic material.

The band B is constituted by a film of hot melt plastic material which has a thickness of a few microns and is preferably transparent; the film is folded onto itself beforehand along a longitudinal direction, so that its two flaps are superimposed in such a manner that one flap is wider than the other, so that one of the edges F protrudes with respect to the other.

The band B is preliminarily wound on a roll or reel 3 which is rotatably supported by the frame and is stretched by stretching rollers 4 and 5 along a substantially horizontal portion. In this portion there is a device 6 which creates a bellows-like recess at the folding line of the band B. The device 6, of a per se known type, is constituted by a pair of coaxial disks 7, which are mutually spaced and rotate between the two flaps, and by an external disk 8 which compresses inward the folding line of the film, making it form a recess.

Figure 6:
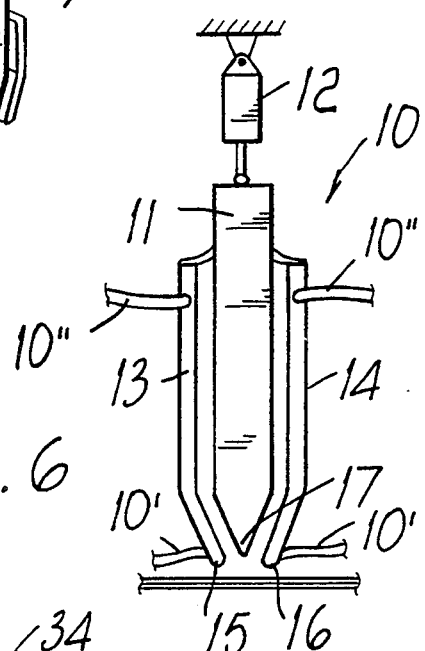
FIG. 6 is a sectional view of a detail of the fusing and cutting device of the machine according to the invention.

Downstream of the device 6, the band B is stretched by a stretching roller 9 before passing through a fusing and cutting unit, generally designated by the reference numeral 10. As shown schematically in FIG. 6, the unit 10 is essentially constituted by a transverse blade 11 which is electrically heated at a constant temperature which is higher than the melting temperature of the band B and can slide along a vertical guiding means, not shown in the drawings; a double-action actuator 12 acts on the blade and lowers and lifts it at preset times.

The blade 11 is coupled, by means of elastic members, to two lateral retention members 13 and 14 which are beak-shaped toward their lower and so as to form two edges 15 and 16 which retain the band in position against a flat lower surface prior to contact with the fusing blade 11. The lower edge 17 of the blade 11 is sharp, so as to also produce, after using, the cut along a transverse line. It is evident that each fusion and cut performed by the blade 17 forms the lateral edges of two adjacent bags which are closed along three consecutive sides and are open at the lateral edge with the protruding flap F. Conveniently, the lateral retention members 13 and 14 are made of metal sheet in order to form internal spaces for the circulation of water, or of any other refrigerating fluid. Particularly, water may flow in the spaces inside the members 13, 14, by means of respective inlet pipes 10' and outlet pipes 10", in turn connected to an external refrigerating assembly arranged in the frame of the machine and which is not illustrated in the drawings for clarity. Downstream of the fusing and cutting unit 10 there is a conveyor belt 18 which is stretched by end rollers 19 and 20 so as to form a horizontal conveyance surface for the advancement of the finished bags. In order to increase the grip of the bags on the conveyor belt 18, the belt is provided, on its surface, with series of holes 21 through which are is drawn by means of a lower chamber 22. The chamber 22 is connected to an aspirator 24 by means of a pipe 23.

The protruding flap F of the bags retained by the conveyor belt 18 rests on the side of the frame laterally to the conveyor belt.

Proximate to the terminal stretching roller 19 there is a device for securing the protruding flap F of the bags during their filling.

In particular, the securing device, generally designated by the reference numeral 25, includes a supporting member 26 which, in inactive position, has an upper surface which is aligned with the upper portion of the conveyor belt 18. A presser member 27 is associated with the supporting member 26 and can move along guides or posts 28, 29 which are rigidly coupled to the supporting member 26. A first pneumatic actuator 30 is coupled to the presser 27 and is meant to move the presser 27 closer and space it so as to secure the protruding flap F of each bag.

A nozzle 31 is inserted in the presser 27 of the securing device 25 and is connected to an impeller to inflate the bag after the device 25 has the protruding flap F.

According to the invention, the securing device 25 can oscillate about an axis which is substantially horizontal and at right angles to the bag advancement direction. In particular, the supporting member 36 has an end which is pivoted to a pivot 32 which is rigidly coupled to the frame 2 along the edge of the conveyor belt 18. There is a second pneumatic actuator 33 for periodically rotating the supporting member 26, and thus the entire device 25, between a substantially horizontal inactive position and a position which is inclined by a preset angle $\alpha$. This angle must be equal to the one formed by the lower face of each product P to be packaged when it is transferred by means of a filling unit, generally designated by the reference numeral 34.

Figure 7:
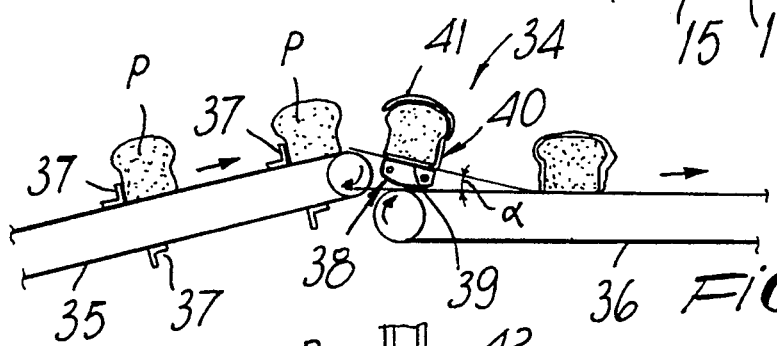
FIG. 7 is a schematic side view of a filling station which can be used in associated with the machine according to the invention, in a laterally arranged position.
Figure 8:
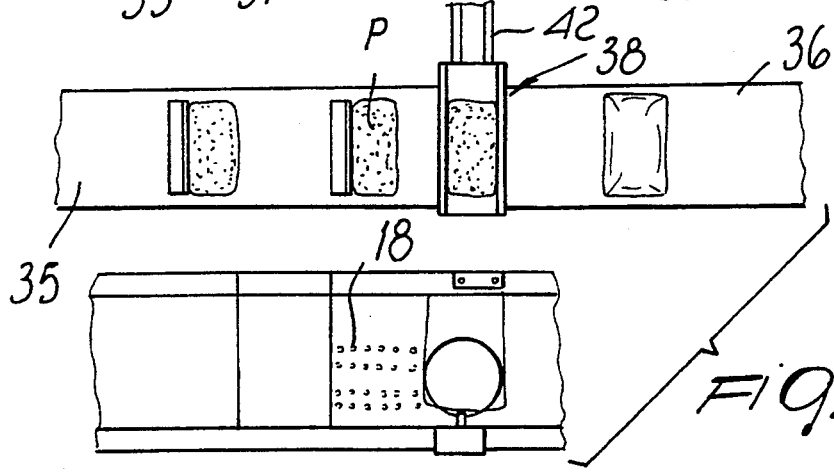
FIG. 8 is a schematic side view of the filling station of FIG. 7, illustrating the relative position of a detail of the machine according to the invention.

As shown in FIGS. 7 and 8, the filling unit 34 acts transversely between a line of products P formed by a feeder belt 35 arranged in series to an unloading belt 36, and the conveyor belt 18 of the machine 1. The belt 35 causes the products to advance in contact with abutment profiles 37 until they are unloaded onto the subsequent belt 36.

The filling device is essentially constituted by a clamp 38 which is formed by a supporting profiled member with a lower resting surface 39 which is inclined by an angle α and has a lateral resting surface 40 which is at right angles to the preceding one. The clamp also include an upper profiled member 41 which is meant to retain the product P against the profiled member 38. In order to fill the bag, the clamp must move transversely, by means of actuators 42, so as to transfer the product inside the bag. After this, the clamp 38 opens slightly, retaining the bag with the product inside it, so as to transfer it onto the unloading belt 36.

According to the invention, there is a second nozzle 43 which is fixed to the edge of the frame so as to direct a jet of compressed air against the protruding flap F directly upstream of the securing means 25, so as to ensure its optimum insertion therein.

Furthermore, in order to increase the grip of the bags on the conveyor belt 18, the surface of the belt is covered by a layer of slightly adhesive material, for example silicone rubber.

In order to prevent the highly noxious fusion fumes from entering the bags together with the inflation air, a hood 44 is arranged on the fusing and cutting unit 10 and is connected by means of a tube 45 to an aspirator 46, with an activated-carbon filter 47 interposed.

Advantageously, in order to automatically vary the width of the bags there is an encoder 48 which detects the position and speed of the conveyor belt and sends signals to a programmable electronic controller inserted in the central control unit of the machine. By programming the controller, the advancement speed and the stop times are set so as to vary the width of the bag while leaving unchanged the capacity and synchronization with respect to the filling unit.

In order to check that the machine is operating regularly, at the securing means there is a detector 50 which transduces the position of a ring-shaped elastic contact member 51. In case of failure to inflate, the detector sends a signal to the controller, which automatically stops the machine.

Finally, in order to allow an external operator to manually stop the machine, along the edge of the frame which is opposite to the filling area there is a safety switch, formed by a steel wire 52 which has one end 53 anchored to a fixed point of the frame and the other end 54 anchored to a remote switch 55 which disconnects main power.

Through the above described features, the packaging machine according to the invention reaches a capacity of up to 90 bag per minute at the maximum speed of the conveyor belt without jamming and proving to have a considerable reliability. Moreover, the machine ensures optimal hygienic condition requested for this type of packaging.

Although the machine according to the invention has been described in a preferred embodiment, it is evident that it is susceptible to numerous modifications and variations which are within the scope of the inventive concept expressed in the accompanying claims.

We claim:

1. Machine for making and positioning bags made of hot melting plastic material, meant to be filled with products having a substantially prismatic shape, comprising a frame which supports in succession:

a means for the feeding and intermittent advancement, in a preset direction, of a band of hot-melt plastic material which is folded onto itself along a longitudinal folding line, with superimposed flaps and so that a lower flap protrudes laterally with respect to an upper flap;

a means for creating a bellows-like recess along the folding line;

a means for the simultaneous fusing and cutting of the band along a transverse direction in longitudinally spaced positions, so as to form a series of adjacent bags which have one side open on the opposite end with respect to the folding line;

a substantially horizontal movable conveyance surface, provided with a negative-pressure means in a downward region for separating the bags and transferring them sequentially toward a product filling unit which is provided with a clamp for gripping one product at a time with a lower resting surface which is inclined with respect to the horizontal;

a means for injecting compressed air into each individual bag through its open side to inflate it prior to filling;

a means for securing each bag along the edge of the protruding flap during inflation;

wherein said securing means is able to oscillate about a substantially horizontal axis, which is at right angles to a product advancement direction, between a substantially horizontal position and an inclined position which is substantially parallel to the lower resting surface of said gripping clamp, so as to arrange the inflated bag at the same angle as the product.

2. Machine according to claim 1, characterized in that said securing means comprises a supporting member which has one end pivoted to the frame and on which a presser member is superimposed, said presser member being movable parallel to said supporting member to secure or release the loose end of the bags.

3. Machine according to claim 2, characterized in that said presser member has, in a substantially central position, a nozzle for injecting compressed air inside the bag after securing it.

4. Machine according to claim 2, characterized in that it comprises a first actuation means which acts on said supporting member to make it oscillate about its axis, said actuation means being coordinated with a second actuation means which acts on said presser member to move it toward and away from said supporting member.

5. Machine according to claim 4, characterized in that it has a secondary nozzle which is arranged upstream of said securing means and is directed toward the protruding edge of the bag in order to stably keep it in contact against the supporting member.

6. Machine according to claim 4, characterized in that said fusing and cutting means comprises an electrically heated blade which is interposed between, and elastically coupled to, two lateral retention members which are meant to retain the band to be fused, a means for reciprocating movement, acting in a substantially vertical direction, being operatively associated with said blade.

7. Machine according to claim 6, characterized in that said retention members are hollow and are cooled by means of a liquid coolant.

8. Machine according to claim 7, characterized in that it has, between said fusing and cutting means and said securing means, a flattening bar which acts parallel to the fusing and cutting blade to flatten each bag onto said horizontal conveyance surface.

9. Machine according to claim 8, characterized in that said flattening bar is coupled in an adjustable manner to said fusing blade in a longitudinal direction in order to adapt to the width of the bags.

10. Machine according to claim 9, characterized in that said flattening bar has an elastically yielding lower layer which is meant to interact with the bags.

11. Machine according to claim 1, characterized in that said conveyance surface consists of a continuous conveyor belt with an external surface layer made of a material which is slightly adhesive with respect to the hot-melt plastic material of which the bags are made.

12. Machine according to claim 1, characterized in that a suction hood is provided above said fusing and cutting means to aspirate the fusion fumes.

13. Machine according to claim 12, characterized in that said hood is connected to an aspirator with an activated-carbon filter interposed.

14. Machine according to claim 1, characterized in that it has an encoder sensor which is coupled to said conveyor belt to detect the position and advancement speed of said conveyor belt, said sensor being connected to a programmable controller to adjust the distance between two consecutive cuts and thus the desired bag width.

15. Machine according to claim 1, characterized in that it has a sensor arranged at the securing means to detect the inflation of each bag and stop the machine in case of failure to inflate.

16. Machine according to claim 1, characterized in that it has a safety switch which can be actuated by an operator and comprises a wire which runs parallel to the side to frame and has one end rigidly anchored to a fixed support and the other end rigidly fixed to a main switch of the machine.

* * * * *